US006314792B1

(12) United States Patent
Cain

(10) Patent No.: US 6,314,792 B1

(45) Date of Patent: Nov. 13, 2001

(54) TESTING OF FLUID SYSTEMS

(75) Inventor: Bernard Cain, Stafford (GB)

(73) Assignee: Project Fire Engineers Limited, Stafford (GB)

( * ) Notice: Subject to any disclaimer, the term of this patent is extended or adjusted under 35 U.S.C. 154(b) by 0 days.

(21) Appl. No.: 09/194,034

(22) PCT Filed: Nov. 8, 1996

(86) PCT No.: PCT/GB96/02736

§ 371 Date: Nov. 19, 1998

§ 102(e) Date: Nov. 19, 1998

(87) PCT Pub. No.: WO97/49923

PCT Pub. Date: Dec. 31, 1997

(30) Foreign Application Priority Data

Jun. 26, 1996 (GB) .................................................. 9613399

(51) Int. Cl.[7] ............................ G01M 3/02; G01N 21/00

(52) U.S. Cl. ................................................ 73/37; 73/1.05

(58) Field of Search ............................ 73/37, 49.3, 1.05, 73/1.25, 1.36; 137/552.7, 557, 559

(56) References Cited

U.S. PATENT DOCUMENTS 5,320,138 * 6/1994 Ferlitch, Jr. ...................... 137/552.7

FOREIGN PATENT DOCUMENTS

02279173 * 11/1990 (JP) .............................. A62C/37/50
WO 88/08524 * 11/1988 (WO) ............................ G01M/3/26

* cited by examiner

*Primary Examiner*—Hezron Williams
*Assistant Examiner*—Jay L. Politzer

(57) ABSTRACT

A method and apparatus for testing a component in a fluid system in which the component operates in response to flow of fluid in the system in the vicinity of the component. A closed loop is established for the flow of fluid in the part of the system including the component. The correct operation of the component in response to the flow of fluid is checked.

10 Claims, 2 Drawing Sheets

TESTING OF FLUID SYSTEMS

TECHNICAL FIELD

This invention relates to the testing of components in fluid systems.

BACKGROUND ART

The invention has been devised primarily, although not exclusively, for the testing of components in automatic fire sprinkler systems. In such systems, particular examples of components whose correct operation may require to be tested are flow detectors and one-way valves. The former may simply fail to operate as required, while the latter may stick. Fire sprinkler systems present special problems as compared with, for example, water supply systems for other purposes, in that they are required to function correctly when required to do so in an emergency, but might remain unused for long periods of time. Thus they are required to be tested at regular intervals and hitherto such testing has been carried out by the running off of a quantity of water. This is wasteful of water, and has a further disadvantage in that it usually requires attendance of personnel at, possibly, a large number of places in the system.

Accordingly it is the object of the present invention to provide for the overcoming or reduction of these disadvantages.

SUMMARY OF THE INVENTION

According to one aspect of the invention, a method of testing a component in a fluid system is provided which operates in response to flow of fluid in the system in the vicinity of the component, comprising establishing a closed loop for flow of fluid in the part of a system including the component, causing flow of the fluid in the closed loop, and checking for correct operation of the component in response thereto.

According to another aspect of the invention, an apparatus for testing for correct operation of a component in a fluid system, is provided which includes means for establishing a closed loop for flow of fluid including a part of the system incorporating the component, means for causing flow of fluid in the closed loop, and means for checking correct operation of the component in response to the flow of fluid.

According to yet a further aspect of the invention, a fluid system incorporating a component responsive to flow of fluid in the is provided which includes means establishing a closed loop for flow of fluid including a portion of the system wherein the component is disposed; means for causing flow of fluid in the closed loop, and means for checking correct operation of the component in response to the flow.

The means for causing the flow preferably comprises a pump incorporated in a part of the closed loop.

The component whose operation is required to be checked may be a flow detector, in which case the indication of satisfactory operation of the component may be given by the emission of a signal therefrom indicative of the presence of flow, upon flow being caused to take place in the closed loop.

Alternatively, the component whose correct operation is required to be checked may be a non-return valve. Means for causing reverse flow of fluid in the closed loop or another closed loop, e.g. a reversible pumping means may be provided, and a flow detecting means be provided to ascertain whether flow takes place in one direction upon operation of the pumping means but not in the other direction when the pumping means is reversed.

The reversible pumping means may comprise a pump which is reversible in its direction of pumping, e.g. by reversing its driving motor, or two pumps arranged to pump in different directions with the appropriate one being operated as required. Suitable valves may be arranged as required, and one or more closed loops may be provided.

The component may be one which, after having operated, requires to be reset to a starting condition by some flow taking place through or past the component in the direction opposite to that which has caused operation of the component. For example, a flow detector may require such resetting. In this case there may further be provided means for causing reverse flow of fluid in said closed loop or another closed loop wherein said component is disposed.

The means for causing the reverse flow may comprise the pump, the reverse flow being caused by reversing the direction of operation thereof or by the use of valve means to reverse the flow in the closed loop without reversing the direction of operation of the pump.

Alternatively, a further closed loop may be established including the portion of the system wherein the component is disposed, there being means for causing flow of fluid in the further closed loop such as to cause reverse flow of fluid in the portion wherein the component is disposed.

Preferably there is means for isolating the pump and associated components defining the or each closed loop from the fluid system when checking for correct operation of the component is not being carried out.

Preferably the fluid system is an automatic fire sprinkler system. As explained above, there are particular problems and requirements associated with such systems and the testing thereof to ensure satisfactory operation thereof when required if a fire should occur, and the present invention facilitates such testing without wastage of water.

There may be remotely-operable means for causing testing in accordance with the invention to be carried out when required. Such testing may necessitate an operator initiating a testing sequence, or there may be timing means causing the testing to be carried out at predetermined time intervals.

BRIEF DESCRIPTION OF THE DRAWINGS

The invention will now be described by way of example with reference to the accompanying drawings, of which.

DETAILED DESCRIPTION OF THE INVENTION

Figure 1:
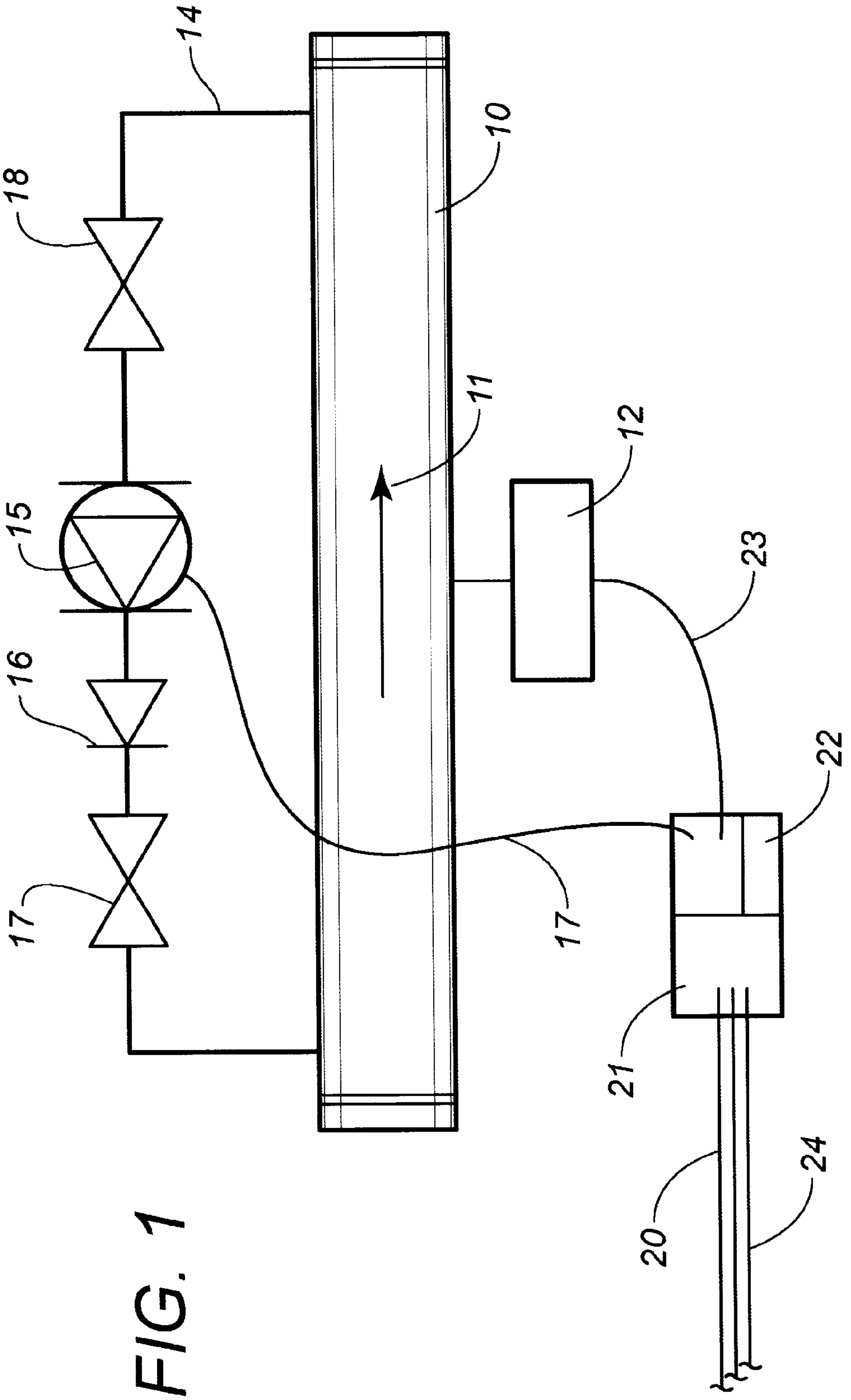
FIG. 1 diagrammatically illustrates part of a fluid system to which one embodiment of the invention has been applied.

Referring to FIG. 1, a pipe, e.g. a sprinkler feed pipe, is indicated at 10 and the normal direction of flow of fluid, e.g. water, therein by the arrow 11. A flow detector sensor device for detecting flow of water in the pipe is indicated at 12, and in a typical fire sprinkler system such flow detector device may provide a signal which causes a pump to start upon detection of flow of water and/or causes an alarm to be operated.

In accordance with the present invention, further pipework is provided and connected as indicated generally at 14 to define with the part of the pipe 10 including the sensor 12 a closed loop. The further pipework 14 includes a pump 15, a non-return valve 16, and two shut-off valves 17, 18. When the pump 15 is operating, it causes flow of water through the pipe 10 and the additional pipework 14 in a circulation through the closed loop and past the sensor 12. Thus, by causing the pump to be operated, and by checking for the presence of the signal from the sensor 12, correct operation of the sensor 12 can be checked without having to draw off any water from the pipe 10 downstream of the sensor 12.

The pump 15 is an electrically operated pump of any suitable type, and derives its electrical supply through a cable 19 from a power supply 20 by way of a terminal box 21. The terminal box 21 may contain a timing device 22 to cause the pump to be brought into operation at preset time intervals. The signal from the sensor 12 is passed by line 23 to a further part of the terminal box 21 and then by a line 24 leading to a suitable control system.

Figure 2:
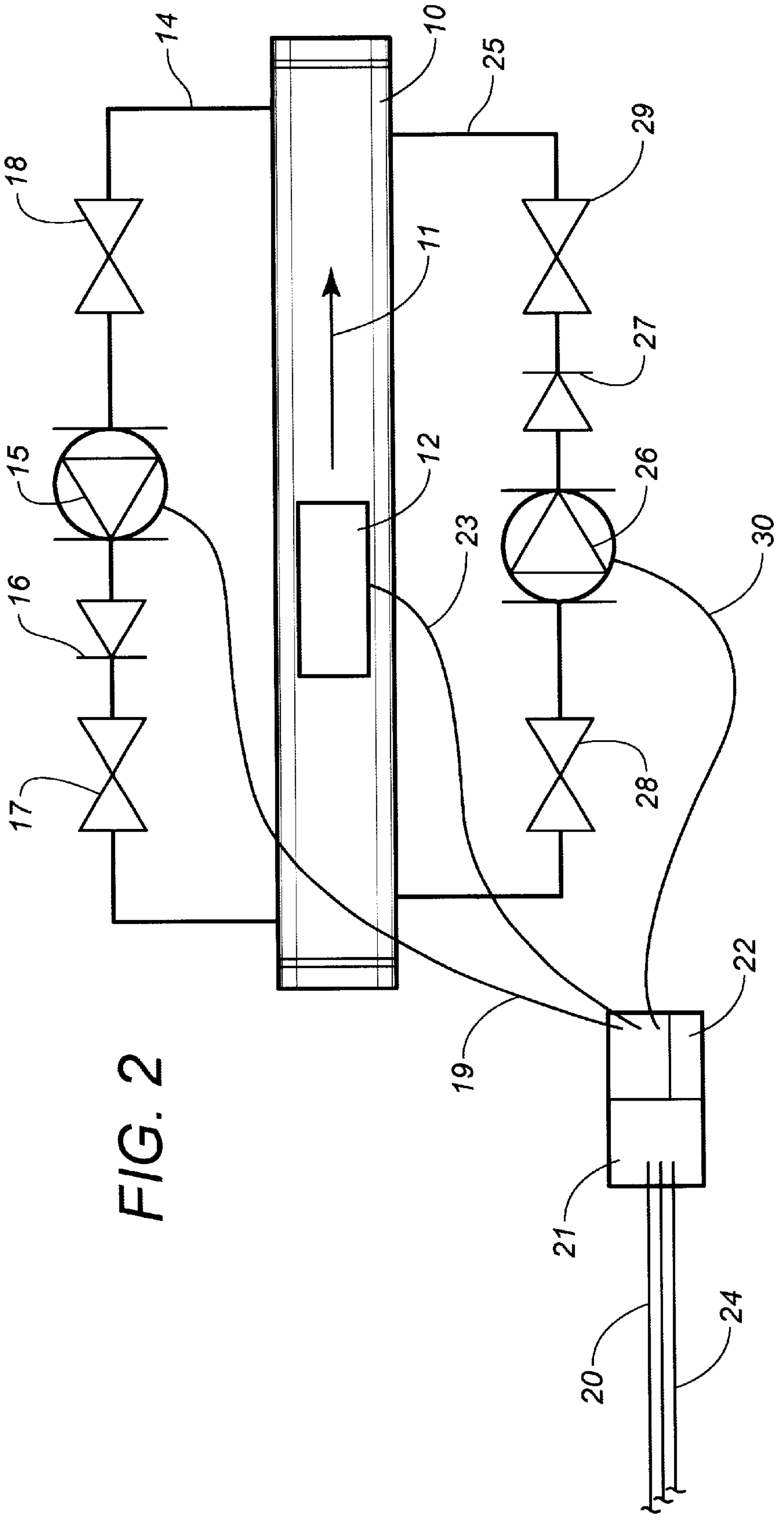
FIG. 2 illustrates part of a fluid system to which another embodiment of the invention has been applied.

Referring now to FIG. 2 of the drawings, this shows part of a system which is as shown in FIG. 1, but with the addition of further pipework 25 to define another closed loop with the part of the pipe 10 including the sensor 12, the further closed loop including a further pump 26, a non-return valve 27, and two shut-off valves 28, 29. The pump 26 has an electrical power supply through a cable 30.

The direction of operation of the pump 26 is such as to cause flow of water in the closed loop formed by the pipework 25 and the pipe 10 in the direction opposite to the direction indicated by arrow 11. When such flow occurs, it may reset the sensor 12. Thus, after checking operation of the sensor 12 as above described, the sensor may be reset to its initial condition by operation of the pump 26.

Alternatively, for such resetting of a sensor or checking for correct operation of a non-return valve, reverse flow of liquid may be caused by reversal of the direction of operation of a single pump, e.g. by reversing the direction in which a driving motor of the pump operates, or by resetting appropriate valve means so that despite flow of water through the pump in the same direction the flow in the closed loop including the pump is caused to take place in the opposite direction. Such operation of a pump and/or valve means may be caused to take place automatically as determined by a suitable control system, or manually.

Apparatus as above described may be incorporated in association with any other control system of a sprinkler system, or included with other aspects of control of electrical and/or fluid systems in a building.

Although described herein in relation to the detection of flow of water in a fire sprinkler system, it is to be appreciated that the present invention is equally applicable to the testing of components in systems for other purposes and/or using other fluids, for example air or oil.

The features disclosed in the foregoing description, or the following claims, or the accompanying drawings, expressed in their specific forms or in terms of a means for performing the disclosed function, or a method or process for attaining the disclosed result, as appropriate, may, separately or in any combination of such features, be utilised for realising the invention in diverse forms thereof.

What is claimed is:

1. A sprinkler system comprising:

at least one sprinkler;

a pipe connected to the sprinkler;

a sensor means connected to said pipe for producing a signal in response to a flow of water through said pipe;

a pipework in fluid communication with said pipe, said pipework defining a closed loop for the flow of water in a portion of said pipe, said portion of said pipe having said sensor means connected thereto;

a pump means for causing the flow of water in said closed loop, said pump means connected to said pipework; and a checking means connected to said sensor means for checking on an operability of said sensor means in response to the flow of water.

2. The system of claim 1, said pump means comprising:

a pump positioned within said pipework.

3. The system of claim 1, said sensor means being a flow detector.

4. The system of claim 1, further comprising:

a non-return valve positioned in said pipework.

5. The system of claim 1, said sensor means moveable between a starting position and an operating position, said sensor means being resettable to said starting position by a water flow in a direction opposite to another direction of water flow when said sensor means is in said operating position.

6. The system of claim 5, said pump means comprising:

a means for reversing a direction of the flow of water in said closed loop, said means for reversing connected to said pipework.

7. The system of claim 6, said means for reversing comprising a single reversible pump.

8. The system of claim 6, said means for reversing comprising:

a first pump suitable for pumping water in one direction;

a second pump suitable for pumping water in an opposite direction; and a control means for selectively activating one of said first and second pumps.

9. The system of claim 5, further comprising:

a valve means connected to said pipework for causing water flow in one of said directions.

10. The system of claim 1, further comprising:

means for isolating said pipework from said pipe when said checking means is not operating.

* * * * *